UNITED STATES PATENT OFFICE.

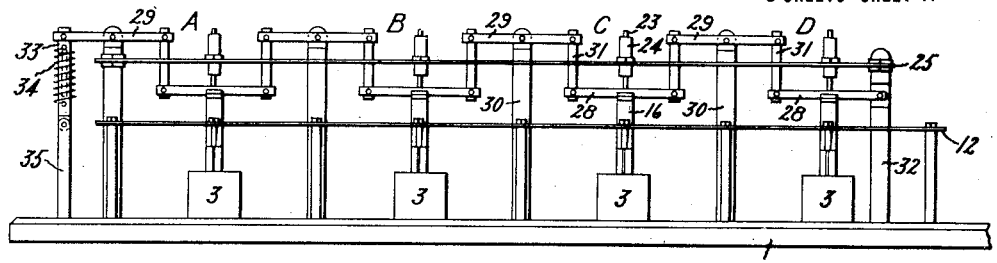
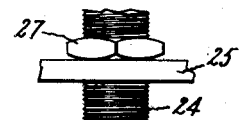
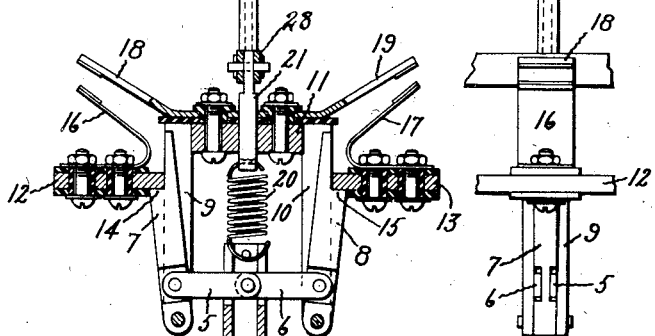

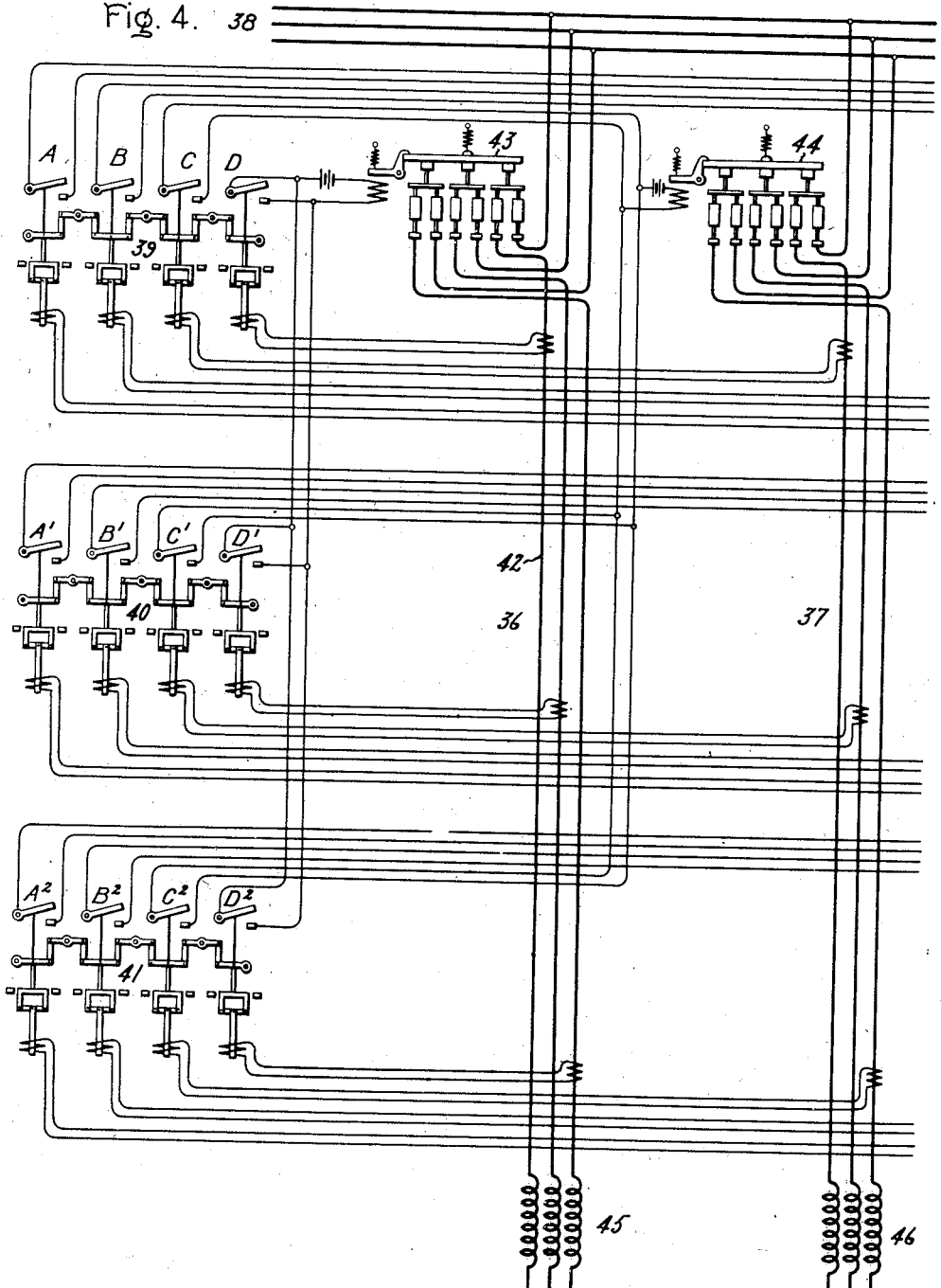

ARCHIBALD H. DAVIS, OF SCHENECTADY, NEW YORK, ASSIGNOR TO GENERAL ELECTRIC COMPANY, A CORPORATION OF NEW YORK.

PROTECTIVE DEVICE FOR SYSTEMS OF DISTRIBUTION.

1,222,536.   Specification of Letters Patent.   Patented Apr. 10, 1917.

Application filed March 13, 1914. Serial No. 824,570.

*To all whom it may concern:*

Be it known that I, ARCHIBALD H. DAVIS, a citizen of the United States, residing at Schenectady, in the county of Schenectady, State of New York, have invented certain new and useful Improvements in Protective Devices for Systems of Distribution, of which the following is a specification.

My invention relates to protective devices for systems of distribution and especially to those systems in which a plurality of feeders are connected in parallel between the generating and receiving ends of the system. In such a system it is essential, in order to secure safe and continuous operation, that any feeder upon which a fault has developed should be disconnected from the healthy feeders both at the generating and the receiving ends. By so disconnecting the faulty feeder, the current in the system is prevented from flowing through the healthy feeders to the fault and thus maintaining the fault.

The object of my invention is to provide a novel and improved device for the protection of systems of distribution and particularly those systems using parallel feeders, which device is positive and efficient in its action and which automatically maintains the continuity of the system when any feeder is at fault.

My invention consists briefly of a novel protective relay of unit construction, comprising as many units as there are parallel feeders to protect. Each relay device protects one and similar phases of each parallel feeder and there are, therefore, as many relay devices as there are phases of the system. The units of each relay comprise solenoids connected to similar phases of each parallel feeder and energized by the current flowing in that phase, that is, all the units of each relay receive current from a similar phase of each feeder. The armatures of the solenoids in each unit are connected together by a mechanically balanced link mechanism so that under normal operating conditions, the armatures are balanced against the pull of their respective solenoids. Should, however, a fault occur upon any phase of any feeder then, due to the current rush upon this phase to the fault, its respective solenoid will exert a pull upon its armature strong enough to overcome the normal mechanical balance of the link mechanism. The armature, in being so attracted, coöperates with a mechanism to close the trip circuit of the oil switch upon the feeder containing the faulty phase. The armature may also be automatically locked against further movement while there is zero current on the feeder. The tripping circuits of the oil switches on each feeder are arranged to be closed and the faulty feeder cut from the system when any phase of the feeder is at fault.

The novel features which I believe to be characteristic of my invention will be definitely indicated in the claims appended hereto; the features of construction and mode of operation will be understood by reference to the following description taken in connection with the accompanying drawings which show the preferred embodiments of my invention and in which—

Figure 1 is a vertical sectional view of one unit of a protective relay device embodying the novel features of my invention; Fig. 2 is an end elevation of my novel relay locking mechanism; Fig. 3 shows my novel relay device comprising, for purposes of illustration, four units similar to Fig. 1 connected by my novel mechanically balanced link mechanism; and Fig. 4 is an explanatory, diagrammatical illustration of a system, arranged in accordance with my invention, showing my protective relay as applied to the protection of four parallel feeders.

In Fig. 1 the solenoid 1, which is energized from one phase of the feeder to be protected, is shown suitably mounted upon the insulating base or support 2, the solenoid being inclosed and held in position upon the base 2 by a metallic shield or shell 3. Suspended above and extending into the solenoid 1, is the armature or core 4. Pivotally connected to this armature are two links 5 and 6 which in turn coact with and are pivotally connected to, the arms or restraining members 7 and 8 respectively. The arms or restraining members 7 and 8 are pivotally mounted at their lower ends between the bifurcated sides 9 and 10 respectively of a U-shaped frame or contact carrying member 11 which is shown more clearly in Fig. 2. By this construction, any movement of the armature 4 is communicated equally to the restraining members 7 and 8 through the agency of the links 5 and 6 respectively, which movement causes the restraining members 7 and 8 to move between the bifurcated sides 9 and 10 respectively, and about their fixed pivots as an axis. The movement of the restraining members 7 and 8 is limited in one direction by the top portion of the U-shaped frame 1 and in the other direction by the two parallel supports or bars 12 and 13 respectively. These parallel supports or bars are suitably mounted upon the base 2, as best shown in Fig. 3, and not only serve to limit the movement of the restraining members 7 and 8 in one direction but also coöperate with the stops or lugs 14 and 15, upon the restraining members 7 and 8, respectively, to lock the U-shaped frame against movement in a manner which will be hereinafter more fully described. Upon the parallel bars 12 and 13, and suitably insulated therefrom, are mounted, the fixed spring contacts or contact members 16 and 17, respectively, which coöperate with the movable contacts or contact members 18 and 19 respectively to close an auxiliary tripping circuit. The coöperating movable contacts 18 and 19 are rigidly secured to the top portion of the U-shaped frame or contact carrying member 11 and suitably insulated therefrom.

A resilient connection or spring 20 is attached, at one end, to the upper end of the armature 4, the other end of the spring being secured to the rod 21 which extends through the top portion of the U-shaped frame 11 and is rigidly secured thereto. The U-shaped frame 11 is slidably mounted between the parallel bars 12 and 13 and, from the construction so far described, it is apparent that the U-shaped frame 11, in moving, carries the movable contacts 18 and 19, and the resiliently mounted armature 4, with coöperating links 5 and 6 and the restraining members 7 and 8. The U-shaped frame 11 is pulled down into circuit closing position bringing the movable contacts 18 and 19 into engagement with their respective fixed contacts 16 and 17, by the movement of the armature 4 under the attraction of the solenoid 1 and is moved up into circuit opening position to disengage the movable and fixed contacts, under the action of the mechanically balanced link mechanism and the springs 22 as will be described later.

The spring 22 is secured at one end to the plunger or rod 23 and at the other end to the base of tube 24 which is threaded on the outside and adjustably mounted upon a supporting bar 25. The supporting bar 25 is suitably mounted, as shown in Fig. 3, upon uprights secured to the base 2. The plunger or rod 23 is provided at its lower end, with a recess into which an elongated projection of the rod 21 extends. By this construction the rod 23 is slidably mounted upon the upper end of the rod 21 and is held in alinement therewith. The rod 23 passes, with slight clearance, through the top of tube 24 and is threaded into lock-nuts 26 whereby the position of the rod is made adjustable and the tension of the spring 22 strengthened or reduced by raising or lowering the rod 23. The adjustment of the tube 24 on the supporting bar 25 is secured by the lock-nut 27. This mechanism including the rod 23, spring 22 and tube 24 will be hereinafter referred to as the resetting mechanism for the relay.

Under normal operative conditions, the solenoid 1 is sufficiently energized to attract its armature 4 against the action of the spring 20 causing the restraining arms 7 and 8 to be pulled in between the bifurcated sides 9 and 10 respectively. The U-shaped frame is thus unlocked and is normally free to move up or down between the parallel bars 12 and 13 but is held in normal circuit opening position by the mechanically balanced lever mechanism. In the case, however, of an excessive current flow through the solenoid 1, a pull is exerted upon the armature 4, sufficient to overcome the mechanical balance of the link mechanism and the U-shaped frame 11 is pulled down into circuit closing position. When the movable contacts 18 and 19 come into engagement with the fixed contacts 16 and 17 respectively, a tripping circuit is closed which acts to cut off the current through the solenoid and allows the U-shaped frame to be moved up into normal current opening position under the action of the link mechanism and the springs 22 in a manner to be later described. The U-shaped frame is, however, locked in this position against further movement upward due to the fact that when the solenoid is deënergized, the armature 4 is released and, under the action of the spring 20, raises the links 5 and 6 which, in turn, move the coöperating restraining members 7 and 8 outwardly to bring the lugs 14 and 15 into contact with the parallel bars 12 and 13 respectively. The U-shaped frame is thus locked against further upward movement and held out of mechanical balance as long as there is zero current through the solenoid 1. The links 5 and 6 and their respective coöperating members 7 and 8 will be hereinafter referred to as the locking mechanism for the relay. When normal current again passes through the solenoid 1, its plunger is pulled down against the action of spring 20 and the restraining members 7 and 8 are pulled inwardly to cause the locking mechanism to release the U-shaped frame and allow it to return to its normal free moving position.

Merely for purposes of illustration, I have shown, in Fig. 3, the combination of four of my novel relay units, A, B, C, and D, to form a relay device, embodying the novel features of my invention, for the protection of a system containing four parallel feeders. It will be readily understood that any number of feeders can be thus protected by adding a unit for each feeder to be protected. The device shown in Fig. 3 protects similar phases on each feeder and there are therefore installed as many of these relays as there are phases to protect. For a three phase system, for example, with four parallel feeders, three relays of four units each would be installed at the generating and receiving ends of the system.

The four relay units A, B, C, and D are connected together or interlocked by a novel mechanically balanced link or interlocking mechanism comprising two similar sets of horizontal levers 28 and 29. Each pair of parallel levers 28 are pivotally secured at their centers to the rods 21, as best shown in Fig. 1, and hence to the U-shaped frames 11 of each unit and the levers 29 are pivotally secured at their centers to the vertical supports 30 which are suitably mounted upon the base 2. The two sets of levers 28 and 29 are pivotally connected together at each end by the vertical links 31. The levers 28 of the end unit D, are pivotally mounted upon the vertical support 32 thus securing the link mechanism against movement at one end. The mechanism is normally secured against movement at the other end by the levers 29 of the other end unit A which is pivotally connected to a tripping member 33, the tripping member being resiliently connected by means of a spring 34 to a support 35 mounted upon the base 2. The tripping member 33 and spring 34 constitute an overload tripping device for the mechanically balanced mechanism, the operation of which will be hereinafter more fully described.

When all the four feeders are carrying current under normal conditions upon the system, the link mechanism is normally mechanically balanced, as shown in Fig. 3, for under these conditions, the solenoids 1 of each unit receive equal amounts of current and the pull exerted by each solenoid upon its respective armature 4 is therefore equal. The pull exerted upon each armature, is, however, sufficient to overcome the tension of its spring 20 and thus hold the locking mechanism for the relay in inoperative position. The tension on the springs 22 and the position of the tubes 24 are also adjusted so that the lugs 14 and 15 of the locking mechanism are below the parallel bars 12 and 13 respectively. When there is, therefore, a normal current flow upon each of the parallel feeders, the four units of the relay device are held in a balanced condition by the link mechanism as no one solenoid receives enough current to attract its armature sufficiently to disturb the mechanical balance of the relay.

Assume that a fault develops upon the phase of the feeder corresponding to the unit D. There will then develop, a current rush upon this phase of the faulty feeder to the fault, greater than the increase of current on the other feeders, which causes a consequent increase in the energization of the solenoid of unit D. This increase in energization causes the solenoid to exert a pull strong enough to overcome the mechanical balance of the system, that is, the armature 4 of unit D is sufficiently attracted to pull its U-shaped frame 11 down as a unit against the mechanical balance of the link mechanism. The U-shaped frame 11 in being pulled down as a unit, moves into circuit closing position, thus completing the tripping circuit of the oil switch upon the faulty feeder. The oil switch upon opening, cuts the faulty feeder from the system and in so doing, deënergizes the solenoid which has been receiving current from the faulty phase of the faulty feeder.

Upon deënergization, the armature 4 of unit D is released and under the tension of the spring 20, the locking device for the relay is moved into operative position to prevent the movement of the U-shaped frame into normal free moving position. The U-shaped frame 11 is, however, moved into circuit opening position, upon deënergization of the solenoid 1, in the following manner: When the U-shaped frame 11 of unit D is pulled down, under the increase in energization of the solenoid 1, the levers 28 of unit D are likewise pulled down about its fixed end as a pivot. The levers 28 in moving down move the elongated projection on rod 21 down within its recess in rod 23 thus moving the rod 21 away from the rod 23, the latter remaining stationary. The two rods are still held in alinement, however, by the projection on the rod 21 remaining in its recess in rod 23. The movement of the levers 28 downward is transmitted by links 31 and 29 to the levers 28 of unit C and in like manner to levers 28 of units B and A. As the end levers 29 of the link mechanism are, under all but excessive conditions, pivotally fixed at its end joining the tripping member 33, the movement of the levers 28 of unit D downward must be balanced by a corresponding movement upward of the levers 28 of the other units A, B and C. Accordingly, the levers 28 move upward, raising their U-shaped frames 11, which are in normal free moving position, and forcing the rods 21 against their respective rods 23. This action forces the rods 23 upward and exerts a tension on the springs 22 which causes the springs to exert a downward push upon the levers 28 tending to reëstablish the normal balanced condition of the link mechanism. If the springs 22 are adjusted as hereinbefore described so that all are equal in strength, all the levers 28 will move up a proportional amount, but if one spring 22 is weaker than the others, the levers 28 of this unit will move up the entire amount and the other units will remain unaffected. It makes no difference, however, to the operation of the relay device, which springs 22 take up the movement. As the U-shaped frame 11 of unit D, therefore, moves under the energization of its solenoid, into circuit closing position, one or more of the springs 22 of the other units are put under tension by the mechanism. Upon deënergization of its solenoid, the U-shaped frame 11 is moved back into circuit opening position by the energy stored up in the springs 22 which push their respective levers 28 downward to reëstablish the mechanical balance of the system. The U-shaped frame of unit D cannot, however, return to normal free moving position due to the locking device which is moved into operative locking position when the solenoid is deënergized as has been before described. It is thus apparent that the normal mechanical balance of the link mechanism is only disturbed while the U-shaped frame 11 of unit D is moving into circuit closing position. Although the unit D is locked and held out of mechanical balance while there is zero current through its solenoid, the link mechanism is, however, still normally balanced in so far as the other units A, B and C are concerned and is therefore operative to cut any other feeder from the system upon which a fault may occur. A fault occurring upon a similar phase of another feeder, for instance, upon the phase corresponding to the unit C, will likewise operate to pull the U-shaped frame 11 of unit C down, trip the oil switch upon this feeder and lock the U-shaped frame 11 against further movement. In like manner units B and A can operate to cut the remaining feeders from the system.

As long as there is no current upon the feeder upon which the fault occurred, the unit corresponding to the phase of the feeder at fault, is locked by the locking mechanism before described. When the fault is remedied and the oil switch upon the feeder, again closed, current passes through the now healthy feeder and its solenoid 1 is again energized to attract its armature 4 against the action of the spring 20 and release the locking mechanism. The unit is thus automatically unlocked and the link mechanism of the unit is again in normal mechanical balance with the rest of the link mechanism. It is thus apparent that one or more feeders can be cut out of the system with the consequent locking of their respective units without disturbing the further operation of the protective relay.

Assume that for some reason, either due to a fault or to intentional cutting from the system, three of the four feeders are not carrying current, leaving only one feeder in service. Then the link mechanism of the three units would be locked and unless provision was made, there would be no way for the one feeder to trip out. This difficulty is overcome by providing an overload trip upon the support 35. This overload tripping device consists of a spring 34 with a tension greater than the tension of any one spring 22. By having a spring of this tension, it will require an overload of several times the amount to trip out the feeder alone, as it would if the other three feeders were in service. One end of this spring is secured to the support 35 and the other end to the arm or tripping member 33 which, in turn, is pivotally connected to the end lever 29 of the link mechanism. If any one unit is the only one in service, a heavy overload will furnish sufficient current for its solenoid 1 to cause its U-shaped frame 11 to be pulled down as a unit and this movement will be communicated through the link mechanism to the end lever 29 which will be moved about its pivoted center to raise the tripping member 33 against the action of the spring 34 and thus allow the U-shaped frame 11 to close its contacts and trip out the feeder.

The application of my novel relay device to the protection of a system of distribution is illustrated diagrammatically in Fig. 4. This figure shows only one end of a system in which the generating and receiving ends are connected by four parallel feeders only two of the four feeders, namely 36 and 37, being shown connected to the main feeder 38, the connections of the other two feeders and the installation at the other end of the system being similar to that shown. As previously stated, a protective relay device is installed at each end of the parallel feeders for each phase of the system, each device consisting of as many units as there are feeders to protect. The three relay devices, 39, 40 and 41, shown in Fig. 4, consist of four units each, namely, units A, B, C, and D of relay 39 connected through current transformers to the first phase of each parallel feeder; units $A^1$, $B^1$, $C^1$, and $D^1$ of relay 40 similarly connected to the second phase of each parallel feeder; and units $A^2$, $B^2$, $C^2$ and $D^2$ of relay 41 similarly connected to the third phase of each feeder. Units D, D¹ and D², therefore, protect the three phases of feeder 36 and units C, C¹ and C² protect the three phases of feeder 37 while the remaining two sets of units protect, in similar manner, the remaining two feeders, not shown. The units D, D¹ and D² which protect the three phases of feeder 36 have their contacts, which complete the tripping circuit of the oil switch 43, arranged in parallel relation so that if the contacts of the unit protecting any one phase is closed, the oil switch 43 is tripped open, cutting out the faulty feeder. All the units which protect the remaining feeders are similarly connected.

Assume that a fault occurs upon one phase 42 of feeder 36. Then, due to the current rush upon this phase to the fault, the solenoid 1 of unit D of relay 39 will be sufficiently energized to pull down its armature 4 and hence its U-shaped frame 11 into circuit closing position. The contacts of unit D will, therefore, close the tripping circuit of the oil switch 43 which in opening will cut feeder 36 from the main feeder 38 thus deënergizing not only the solenoid of unit D but also the solenoids connected to the remaining phases of the feeder, namely units D¹ and D². As long as this feeder 36 is cut off from the system the units D, D¹, D², of relays 39, 40 and 41 respectively are locked against movement by the locking mechanism hereinbefore described. The mechanical balance of each of the link mechanisms on the three relay devices is not disturbed, however, so that if a further fault develops upon any one of the feeders, on feeder 37 for instance, the units C, C¹ and C² are operative to cut the feeder from the system by closing the tripping circuit of its oil switch 44. When the faulty feeder is remedied, its oil switch is closed and the three relay solenoids are again energized, the locking mechanism released and the whole relay device returned to normal position under the action of the resetting mechanism.

In the protection of a system comprising parallel feeders, as shown in Fig. 4, it is necessary, to maintain the continuity of the system, that the feeder upon which a fault occurs should be disconnected from the system at both ends. This is carried out by my invention, as has been stated, by providing three relay devices similar to 39, 40 and 41 and similarly connected at the other end of the parallel feeders. In the system of protection, power reactances may or may not be used but in the preferred arrangement, I have shown the use of power reactances 45 and 46 upon feeders 36 and 37 respectively, placed upon the parallel feeders after the protective relays. Similar power reactances are provided for the other ends of the feeders. The advantage of using power reactances is due to the fact that no matter where the fault may occur upon the feeder, the relay devices at both ends of the line operate simultaneously, whereas with no power reactance, the protective relay at the end of the feeder nearest the fault will operate first, followed by the relay at the other end of the feeder. When the fault occurs at or near the center of the feeder, the relays at both ends of the feeder will operate practically simultaneously whether or not a power reactance is used.

It will be understood that my novel protective relay device is not only applicable for the protection of parallel feeder systems but also to distribution systems connected to the receiving station of a parallel feeder system. Such distribution systems may be of radial feeder type or another series of parallel feeders such as is used in a ring system of distribution. In modern practice, when a fault occurs upon any one of the feeders of the distribution system connected to the receiving station, a current rush occurs from the generating station over the parallel feeders to the faulty distribution feeder which often causes the individual protective relays on the parallel feeders to operate and by cutting out all the parallel feeders put out of service the entire distribution system. A fault upon one feeder of the network can therefore destroy the continuity of the whole system. The continuity of a distribution system with protective relays embodying the novel features of my invention, cannot be destroyed by a fault upon any feeder in the distribution system. If the fault occurs upon any of the parallel feeders between the generating and receiving stations, the faulty feeder is cut out as has been described. If the fault occurs upon any of the feeders of the distribution network, whether of a radial or ring system, only the feeder, upon which the fault occurs is cut out, and without destroying the continuity of the system. The current flow from the generating station to the receiving station is increased due to the fault but the current rush is equally distributed over all the parallel connecting feeders so that each of the solenoids of the protective relays are increased in energization an equal amount. Due to the normally balanced link mechanism, the pull exerted upon the armatures of the solenoids is equal and the protective relays thus remain unresponsive to cut the generating from the receiving end of the system.

Other advantages and modifications will be apparent to those skilled in the art other than those shown and described and I, therefore, do not wish to be restricted to the precise construction shown but intend to cover by the appended claims all changes and modifications which are within the scope of my invention and which will be apparent to those skilled in the art.

What I claim as new and desire to secure by Letters Patent of the United States, is:—

1. In a system of distribution having a plurality of circuits, a switch in each circuit, tripping mechanism for each switch responsive to changes in the electrical characteristics of said circuits, and interconnecting means for holding said tripping mechanisms mechanically balanced in normal inoperative position when the electrical characteristics of their respective circuits are substantially similar but allowing any of said tripping mechanisms to respond to changes in the electrical characteristics of their respective circuits and move into tripping position without disturbing the mechanical balance of the other mechanisms.

2. In a system of distribution having a plurality of circuits, a switch in each circuit, an electroresponsive tripping mechanism for each switch energized from each of said circuits, and means interconnecting said tripping mechanisms for mechanically balancing said mechanisms against movement when the energization of said tripping mechanisms is substantially equal but allowing any mechanism more strongly energized to move into tripping position without disturbing the mechanical balance of the other mechanisms.

3. In a system of distribution having a plurality of circuits connected in parallel, a switch in each circuit, an electroresponsive tripping mechanism for each switch responsive to abnormal conditions on each of said circuits, and means interconnecting said tripping mechanism for holding said mechanisms inoperative but in mechanical equilibrium when the energization of said mechanisms is substantially equal and allowing any mechanism more strongly energized to move into operative tripping position without disturbing the equilibrium of the other mechanisms.

4. In a system of distribution having a plurality of circuits connected in parallel, a switch in each circuit, a tripping circuit for each switch, relays responsive to changes in the electrical characteristics of said plurality of circuits for energizing said tripping circuits, and interconnecting means for holding said relays mechanically balanced in normal circuit opening position when the electrical characteristics of their respective circuits are substantially similar but allowing any of said relays to respond to changes in the electrical characteristics of their respective circuits to move into circuit closing position without disturbing the mechanical balance of the other relays.

5. In a system of distribution having a plurality of circuits connected in parallel, a switch in each circuit, a tripping circuit for each switch, relays controlling each tripping circuit energized from each of said plurality of circuits, and interconnecting means for mechanically balancing the pull of said relays against each other when the energization of said relays is substantially equal but allowing any relay having a stronger pull to move into circuit closing position without disturbing the mechanical balance of the other relays.

6. In a system of distribution having a plurality of circuits connected in parallel, a switch in each circuit, a tripping circuit for each switch, relays controlling each tripping circuit energized from each of said plurality of circuits, and a link mechanism interconnecting said relays for holding said relays inoperative but in mechanical equilibrium when the pull exerted by each relay is substantially equal and for allowing any relay having a greater pull to move into operative tripping position without destroying the equilibrium of the other relays.

7. In a system of distribution having a plurality of circuits, the combination with switches connecting each of said circuits to a common bus bar, of tripping circuits for said switches, relays responsive to current flow in each of said plurality of circuits for energizing said tripping circuits, mechanical interconnecting means for holding said relays mechanically balanced against movement when the current flow through said circuits is substantially equal but allowing any of said relays to move into tripping position in response to abnormal current flow without disturbing the mechanical balance of the other relays.

8. In a system of distribution having a plurality of circuits in parallel, a switch in each circuit, a tripping circuit for each switch, relays responsive to the electrical conditions on said plurality of circuits for energizing said tripping circuits, and a link mechanism interconnecting said relays for holding said relays mechanically balanced in inoperative position when the electrical conditions in each of the circuits are substantially similar but allowing any of said relays to automatically move into operative tripping position without disturbing the mechanical balance of the other relays upon the occurrence of an abnormal condition upon its circuit.

9. In a system of distribution having a plurality of circuits in parallel, a switch in each circuit, a tripping circuit for each switch, current responsive means energized from each of said plurality of circuits for controlling said tripping circuits, an interconnecting mechanism for holding said current responsive means mechanically balanced and out of tripping position as long as said means have substantially the same energization but allowing any of said current responsive means having a greater energization to move independently into tripping position without disturbing the operative condition of the other current responsive means, and locking means for holding any of said current responsive means out of mechanical balance with the remaining relays while said current responsive means is deënergized.

10. In a system of distribution having a plurality of circuits connected in parallel, a switch in each circuit, a tripping circuit for each switch, relays controlling each tripping circuit energized from each of said plurality of circuits, a link mechanism interconnecting said relays for holding said relays mechanically balanced in normal free moving position when said relays have substantially the same energization but allowing any relay having a greater energization to move into tripping position without disturbing the mechanical balance of the other relays, resetting means for automatically returning said relays from tripping position to circuit opening position, and locking means operative when said relays move into tripping position to prevent said means from returning to normal free moving position while said relays are deënergized.

11. In a polyphase distribution system having a plurality of circuits connected in parallel, a switch for each circuit, a tripping circuit for each switch, relays controlling each tripping circuit and energized from each phase of each of said plurality of circuits, interconnecting mechanisms for mechanically balancing all said relays energized from similar phases of said circuits against movement when said relays have substantially the same energization but allowing any relay having a stronger energization to move into tripping position without disturbing the mechanical balance of the other relays, said tripping circuits for each switch being energized to open said switch when the relay responsive to any phase of the circuit moves into tripping position.

12. A protective device comprising a plurality of relays, coöperating fixed and movable contacts for each relay, interconnecting means for said relays for holding said fixed and movable contacts out of engagement when each relay is responsive to the same electrical conditions but allowing any relay to move its fixed and movable contacts into engagement in response to abnormal electrical conditions without disturbing the operative condition of the other relays.

13. In a protective device, the combination with a plurality of relays comprising, fixed contacts for each relay, coöperating movable contacts for each relay, a contact carrying member for said movable contacts, of mechanical means interconnecting said contact carrying members for holding said members mechanically balanced in circuit opening position when said relays are energized substantially equally but allowing any relay more strongly energized to move its contact carrying member into circuit closing position without disturbing the mechanical balance of the other contact carrying members.

14. In a protective device, the combination with a plurality of relays comprising, coöperating fixed and movable contacts for each relay, a contact carrying member for said movable contacts of each relay, of a link mechanism interconnecting said contact carrying members for holding said members mechanically balanced in circuit opening position when the energization of said relays is substantially equal but allowing any relay more strongly energized to move its contact carrying member independently into circuit closing position without destroying the mechanical balance of the remaining contact carrying members, and resetting means for automatically returning said contact carrying members from circuit closing to circuit opening position.

15. In a system of distribution, the combination with a plurality of polyphase transmission lines connected in parallel, of a switch for each line, a tripping circuit for each switch, relays controlling each tripping circuit and energized from each phase of each of said transmission lines, a link mechanism interconnecting said relays which are energized from similar phases of said transmission lines for holding said relays normally mechanically balanced in circuit opening position when the pull exerted by each relay is substantially equal but allowing any relay having a greater pull to move into circuit closing position without affecting the mechanical balance of the other relays, resilient means operatively related to said link mechanism for automatically returning said relays from tripping position to normal circuit opening position, and locking means for each relay held normally inoperative when said relays are energized but automatically moved into operative position when said relays are deënergized to hold said deënergized relays out of mechanism balance with the rest of said relays while said deënergized relays remain deënergized.

16. In a system of distribution, the combination with a plurality of polyphase transmission lines connected in parallel, of a switch in each line, a tripping circuit for each switch, relays controlling each tripping circuit responsive to electrical conditions upon each phase of each of said transmission lines, mechanical means interconnected all said relays responsive to electrical conditions upon similar phases of said transmission lines for holding said relays mechanically balanced against movement when the electrical conditions upon their respective transmission lines are substantially similar but allowing any relay to respond to abnormal electrical conditions upon its line to move into circuit closing position without disturbing the mechanical balance of the other relays, said relays responsive to the electrical conditions on any one of the phases of the same transmission line being arranged to energize the tripping circuit of that line and open its switch.

17. In a protective device, the combination with a plurality of relays comprising, fixed contacts for each relay, coöperating movable contacts for each relay, a contact carrying member for said movable contacts arranged to move said fixed and movable contacts into and out of engagement, of mechanical means interconnecting said contact carrying members for holding said members mechanically balanced in free moving circuit opening position whem said relays are energized substantially equally but allowing any relay more strongly energized to move its contact carrying member into circuit closing position without disturbing the mechanical balance of the other contact carrying members, locking means for each of said contact carrying members held inoperative while said members are in normal free moving position but movable into operative position when said members move into circuit closing position to hold said members out of free moving position while their respective relays are deënergized, an overload device operatively related to said link mechanism to allow a movement of said mechanical means when all except one of said contact carrying members are in locked position.

18. In a protective device, the combination with a plurality of tripping relays having members movable into tripping position, of a link mechanism interconnecting said members for holding said members mechanically balanced in circuit opening position while said relays are energized substantially equally but allowing any relay more strongly energized to move its member into tripping position without disturbing the mechanical balance of the other relays.

19. In a protective device, the combination with a plurality of tripping relays having members movable into tripping position, of a link mechanism interconnecting said members for holding said members mechanically balanced in circuit opening position while said relays are energized substantially equally but allowing any relay more strongly energized to move its member into tripping position without disturbing the mechanical balance of the other relays, and resetting means for each relay operatively related to said link mechanism and biased when any of said members move into tripping position to return said members to normal circuit opening position.

20. In a protective device, the combination with a plurality of tripping relays having members movable into tripping position, of a link mechanism interconnecting said members for holding said members mechanically balanced in circuit opening position while said relays are energized substantially equally but allowing any relay more strongy energized to move its member into tripping position without disturbing the mechanical balance of the other relays, and a spring for each relay put under tension by said link mechanism when one of said members moves into tripping position whereby the member is returned from tripping position to normal circuit opening position and the mechanical balance of the relays maintained.

21. In a protective device, the combination with a plurality of tripping relays having members movable into tripping position, of a link mechanism interconnecting said members for holding said members mechanically balanced in circuit opening position while said relays are energized substantially equally but allowing any relay more strongly energized to move its member into tripping position without disturbing the mechanical balance of the other relays, and resetting means for each relay operatively related to said link mechanism and biased when any of said members move into tripping position to return said members to normal circuit opening position, and resilient means connected to one end of said link mechanism for normally holding the end of said mechanism against movement but when only one of said relays is energized to render the end of said link mechanism movable to allow the tripping member of said relay to move into tripping position.

22. A protective device comprising a plurality of relays, a solenoid for each relay, armatures for said solenoids, fixed and coöperating movable contacts for each relay, a contact carrying member for each relay for moving said movable and fixed contacts into and out of engagement in response to the movement of said armatures, restraining members responsive to the movement of each of said armatures for holding said contact carrying members in a locked position, a resilient connection between each of said armatures and said contact carrying members for holding said restraining members normally inoperative while said solenoids are energized but allowing said restraining members to move into locking position when said contact carrying members move into contact engaging position, and mechanical means interconnecting said contact carrying members for holding said members mechanically balanced and preventing said members from moving into contact engaging position when said solenoids are energized substantially equally but allowing any solenoid more strongly energized to move its contact carrying member into contact engaging position without disturbing the mechanical balance of the other contact carrying members.

In witness whereof, I have hereunto set my hand this 12th day of March, 1914.

ARCHIBALD H. DAVIS.

Witnesses:
KATHERINE M. HAYNE,
HELEN ORFORD.